(12) United States Patent
Hsu et al.

(10) Patent No.: US 9,712,074 B2
(45) Date of Patent: Jul. 18, 2017

(54) MAGNETOELECTRIC DEVICE CAPABLE OF DAMPING POWER AMPLIFICATION

(71) Applicants: Fu-Tzu Hsu, Taipei (TW); Chieh-Sen Tu, New Taipei (TW)

(72) Inventors: Fu-Tzu Hsu, Taipei (TW); Chieh-Sen Tu, New Taipei (TW)

(*) Notice: Subject to any disclaimer, the term of this patent is extended or adjusted under 35 U.S.C. 154(b) by 0 days.

(21) Appl. No.: 15/152,064

(22) Filed: May 11, 2016

(65) Prior Publication Data

US 2016/0336869 A1 Nov. 17, 2016

(30) Foreign Application Priority Data

May 13, 2015 (TW) .............................. 104115205 A

(51) Int. Cl.
| | |
|---|---|
| H02M 7/06 | (2006.01) |
| H01F 3/10 | (2006.01) |
| H01F 27/24 | (2006.01) |
| H01F 27/29 | (2006.01) |
| H01F 27/40 | (2006.01) |
| H01F 3/12 | (2006.01) |
| H02M 3/158 | (2006.01) |
| H02M 1/00 | (2006.01) |

(52) U.S. Cl.
CPC ................ *H02M 7/06* (2013.01); *H01F 3/10* (2013.01); *H01F 27/24* (2013.01); *H01F 27/29* (2013.01); *H01F 27/40* (2013.01); *H01F 3/12* (2013.01); *H01F 2003/106* (2013.01); *H02M 3/158* (2013.01); *H02M 2001/0064* (2013.01); *H02M 2003/1586* (2013.01)

(58) Field of Classification Search
CPC .......... H02M 7/06; H02M 7/10; H02M 7/064; H02M 7/066
See application file for complete search history.

(56) References Cited

U.S. PATENT DOCUMENTS

| | | | | | |
|---|---|---|---|---|---|
| 2,483,889 | A | * | 10/1949 | De Groot ................ | H03J 7/042 330/167 |
| 3,122,699 | A | * | 2/1964 | Schohan .................. | G05F 1/32 323/232 |
| 3,567,839 | A | * | 3/1971 | Dijksterhuis .......... | G10H 1/057 84/688 |
| 9,502,987 | B1 | * | 11/2016 | Feno .................. | H02M 3/33546 |
| 9,503,012 | B1 | * | 11/2016 | Hsu ........................ | H02P 27/06 |
| 2003/0142513 | A1 | * | 7/2003 | Vinciarelli .............. | H02J 1/102 363/17 |

(Continued)

*Primary Examiner* — Timothy J Dole
*Assistant Examiner* — Yusef Ahmed
(74) *Attorney, Agent, or Firm* — Hamre, Schumann, Mueller & Larson, P.C.

(57) ABSTRACT

A magnetoelectric device includes reluctance components, damping modules and a driving module. Each reluctance component includes a magnetic core unit having a loop-shaped first segment and a second segment connected to the first segment, first to third coils wound around and loosely coupled to the first segment, a first capacitor connected between the second and third coils, and a second capacitor connected to the third coil in parallel. Each damping module receives electrical energy from a respective reluctance component, and releases electrical energy to a DC power source. The driving module connects the DC power source to each first coil in such a way that a respective AC voltage is generated across each first coil.

11 Claims, 12 Drawing Sheets

(56) References Cited

U.S. PATENT DOCUMENTS

| | | | |
|---|---|---|---|
| 2005/0013145 A1* | 1/2005 | Huber | H01F 27/2847 363/34 |
| 2012/0181794 A1* | 7/2012 | Hsu | H02K 99/10 290/1 A |
| 2015/0280552 A1* | 10/2015 | Hsu | H01F 27/24 323/362 |
| 2015/0372528 A1* | 12/2015 | Hsu | H02J 7/025 320/108 |

* cited by examiner

MAGNETOELECTRIC DEVICE CAPABLE OF DAMPING POWER AMPLIFICATION

CROSS-REFERENCE TO RELATED APPLICATION

This application claims priority of Taiwanese Patent Application No. 104115205, filed on May 13, 2015.

FIELD

The disclosure relates to an electric device, and more particularly to a magnetoelectric device.

BACKGROUND

Referring to FIG. 1, a conventional transformer 1 includes an E-shaped magnetic core 13, an I-shaped magnetic core 14, and a primary coil 11 and a secondary coil 12 that are wound around and tightly coupled to the E-shaped magnetic core 13. The magnetic cores 13, 14 are generally made of a single material, and thus there must be an air gap between the magnetic cores 13, 14 for preventing magnetic saturation, resulting in negative magnetic damping effect and thus limiting output electrical energy. In addition, a counter electromotive force generated at the output side (OUT) of the conventional transformer 1 may directly impact the input side (IN) of the conventional transformer 1, resulting in great eddy current loss. As a result, even if the conventional transformer 1 has high conversion efficiency, it can only be used for transmission or transfer of electrical energy.

SUMMARY

Therefore, an object of the disclosure is to provide a magnetoelectric device capable of damping power amplification. The magnetoelectric device has positive magnetic damping effect and may store usable electrical energy.

According to the disclosure, the magnetoelectric device includes a plurality of reluctance components, a plurality of damping modules and a driving module. Each of the reluctance components includes a magnetic core unit, a first coil and a resonant circuit. For each of the reluctance components, the magnetic core unit is both capacitive and inductive, and has a loop-shaped first segment and a second segment connected to the first segment, the resonant circuit includes a second coil, a third coil, a first capacitor and a second capacitor, the first, second and third coils are wound around and loosely coupled to the first segment, the first capacitor is connected between the second and third coils, and the second capacitor is connected to the third coil in parallel. Each of the damping modules is connected to the resonant circuit of a respective one of the reluctance components for receiving electrical energy therefrom, and is used to be connected to a DC (direct current) power source for releasing electrical energy thereto. The driving module is connected to the first coil of each of the reluctance components, is used to be connected to the DC power source, and is configured to connect the DC power source to the first coil of each of the reluctance components in such a way that a respective AC (alternating current) voltage is generated across the first coil of each of the reluctance components.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Referring to FIGS. 2 to 5, an embodiment of a magnetoelectric device according to the disclosure includes a number (N) of reluctance components (R, S, T), a number (N) of damping modules 2, a driving module 5 and a controller 8, where N=3.

Figure 1:
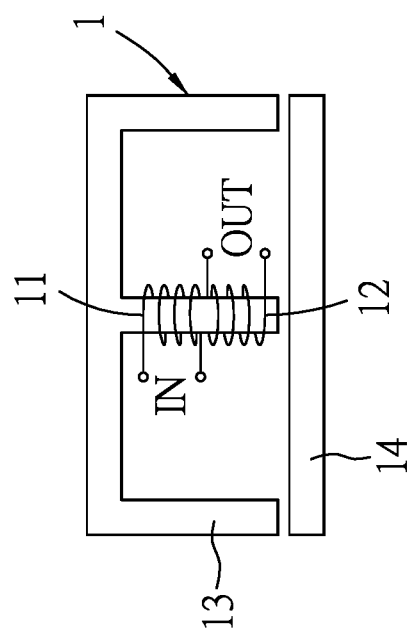
FIG. 1 is a schematic diagram illustrating a conventional transformer.
Figure 2:
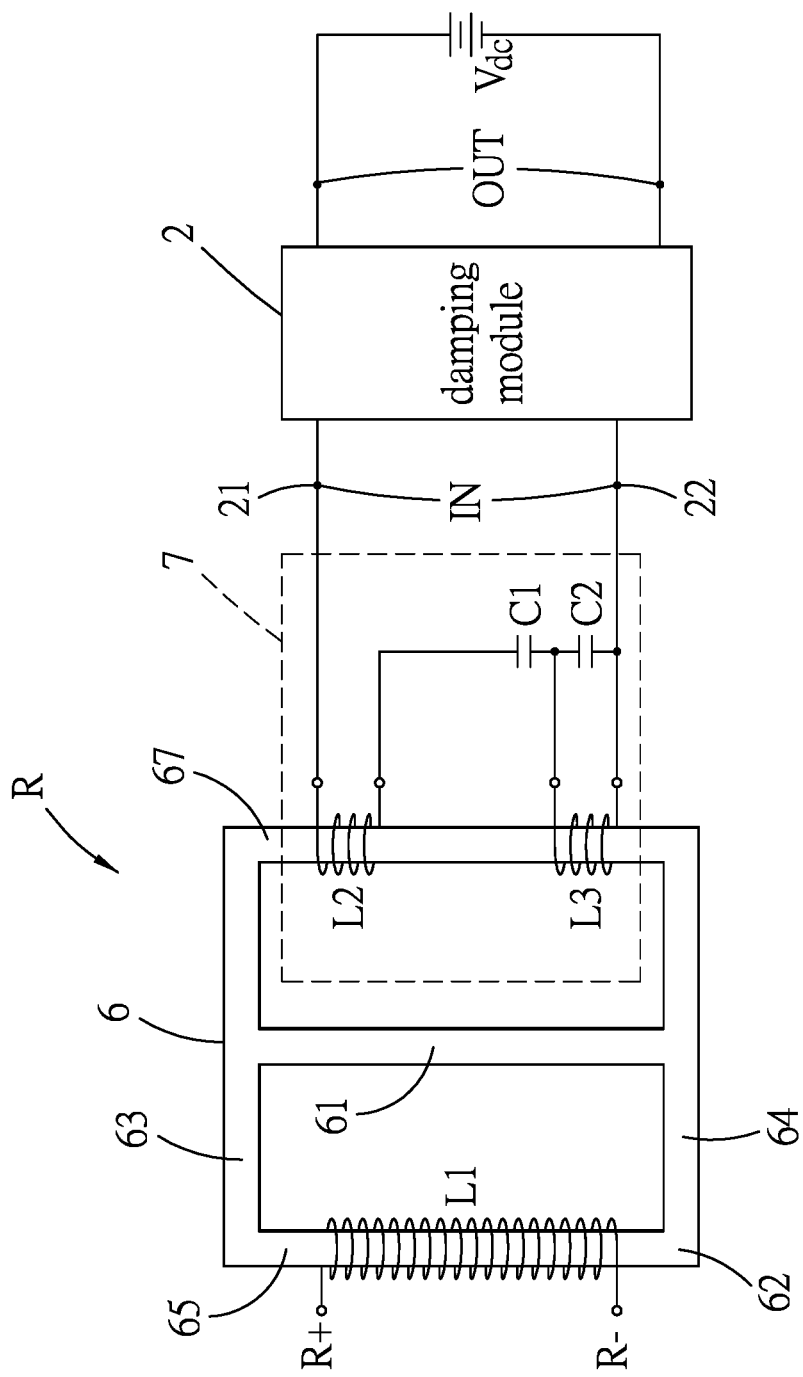
FIGS. 2 to 5 are schematic circuit block diagrams illustrating an embodiment of a magnetoelectric device according to the disclosure.
Figure 3:
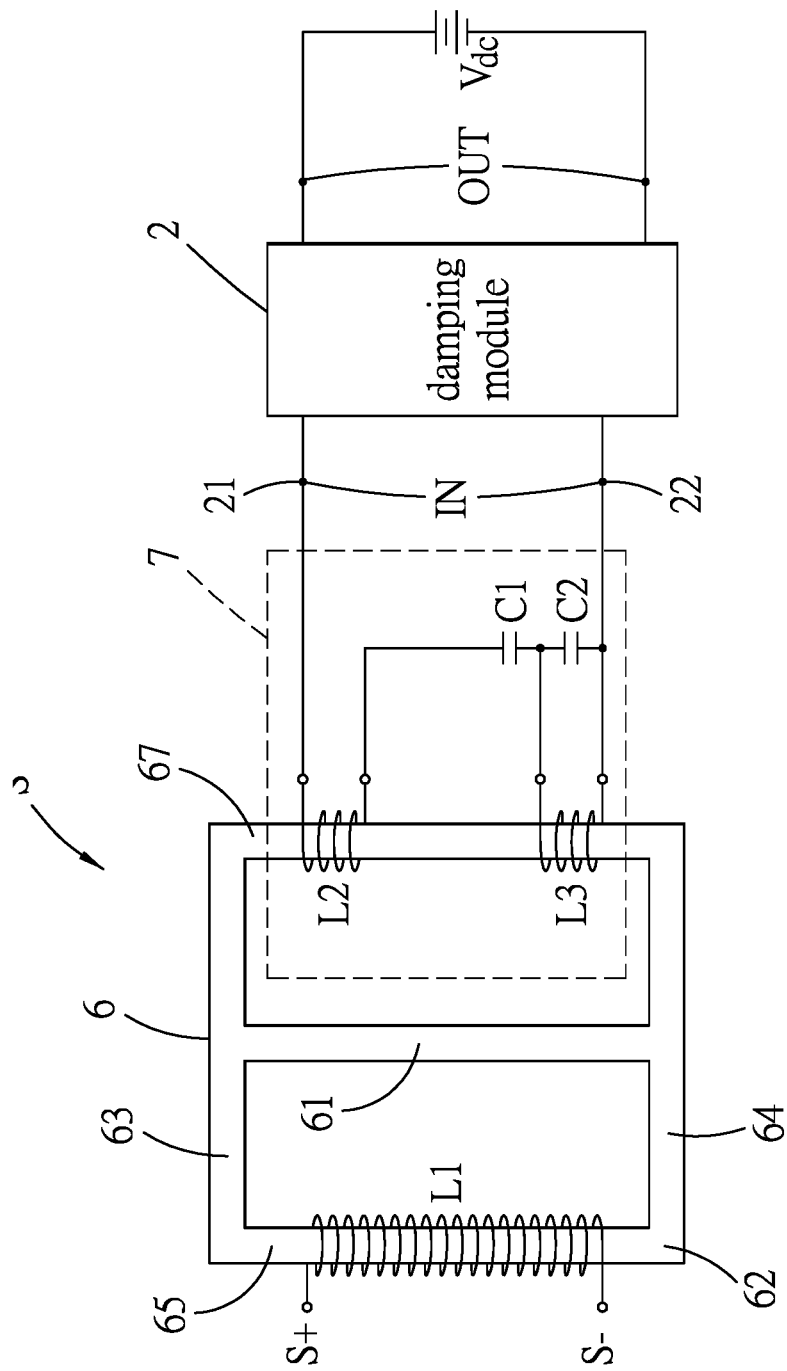
Figure 4:
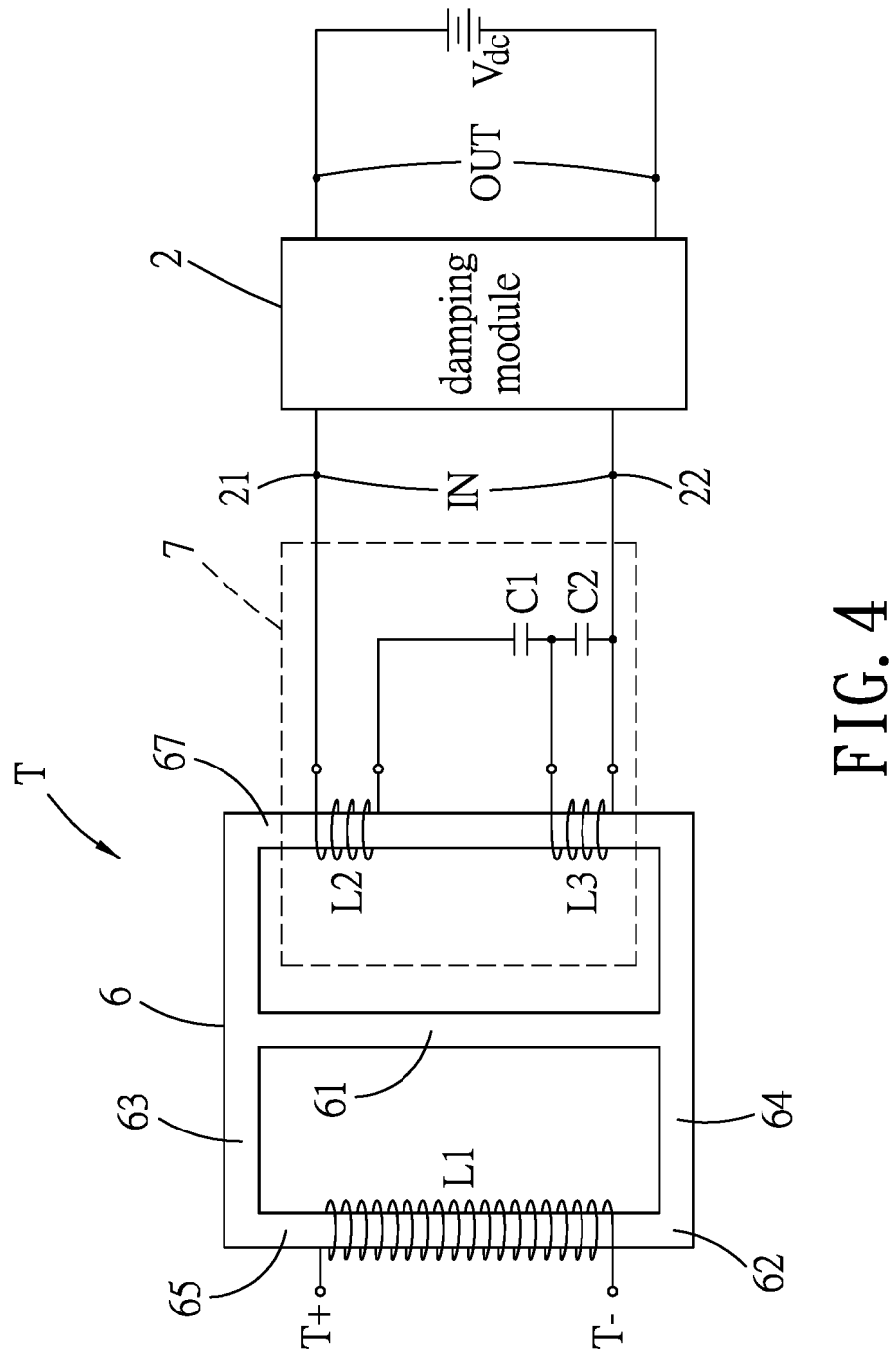
Figure 5:
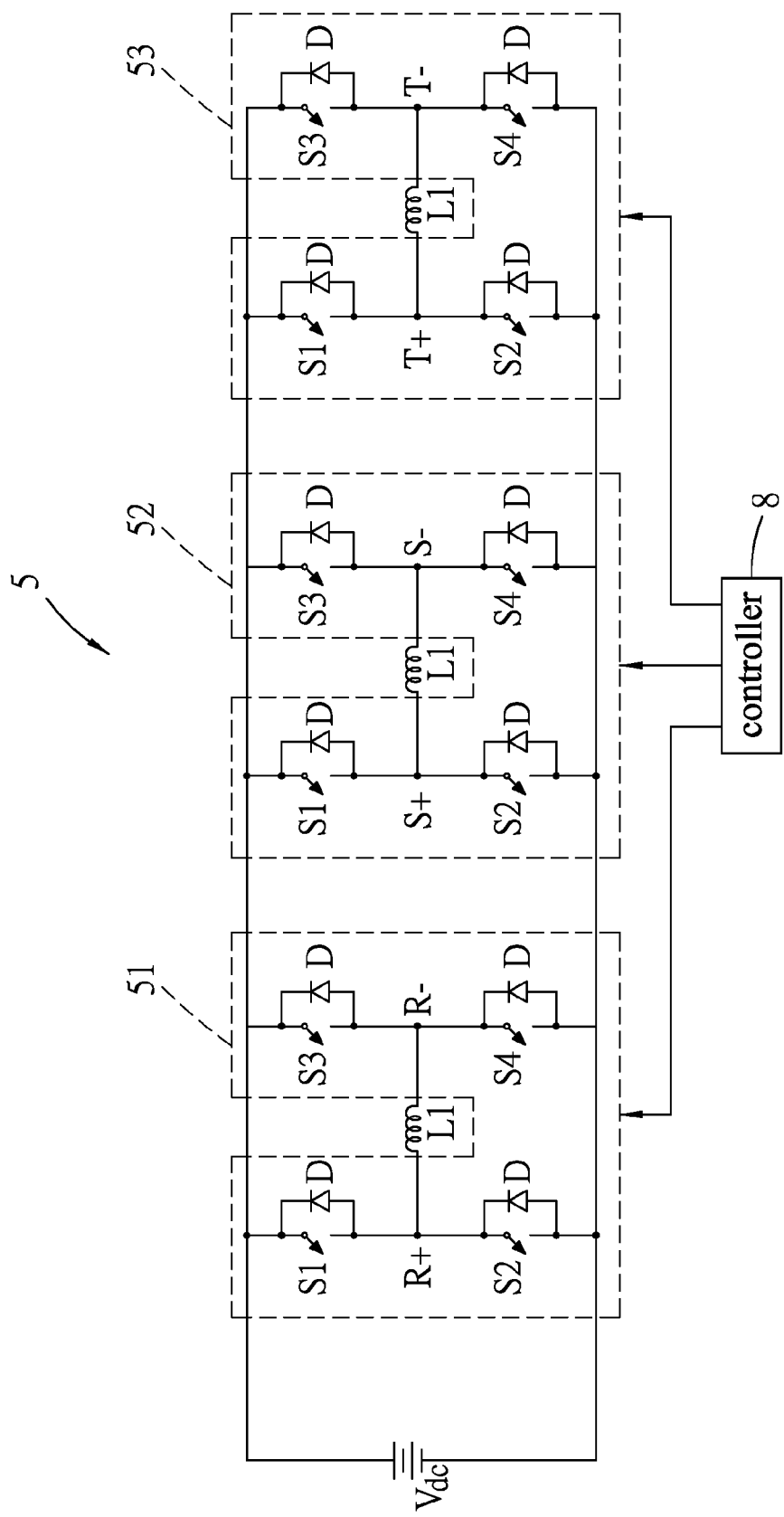
Figure 6:
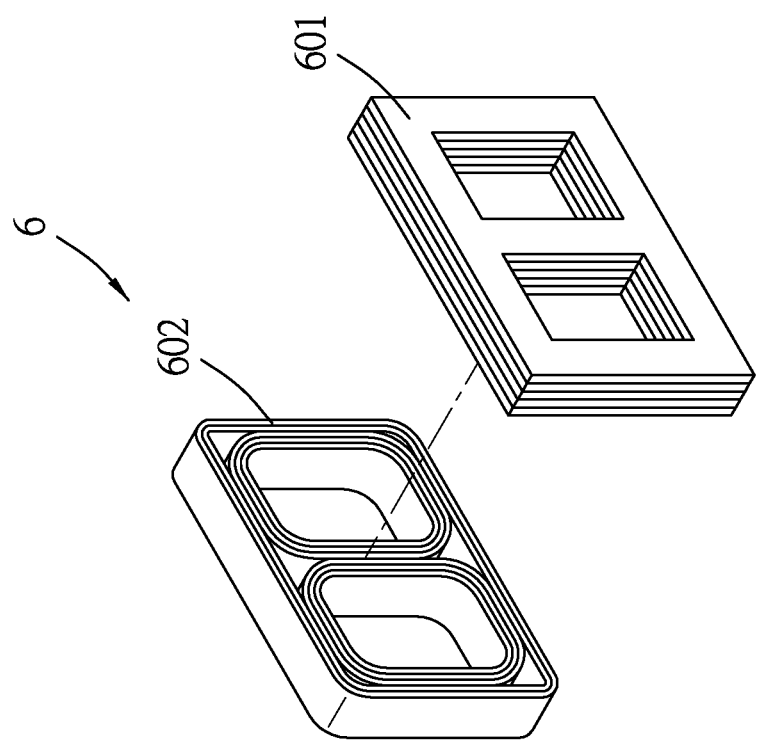
FIG. 6 is an exploded perspective view of a first implementation of a magnetic core unit of each reluctance component of the embodiment.
Figure 8:
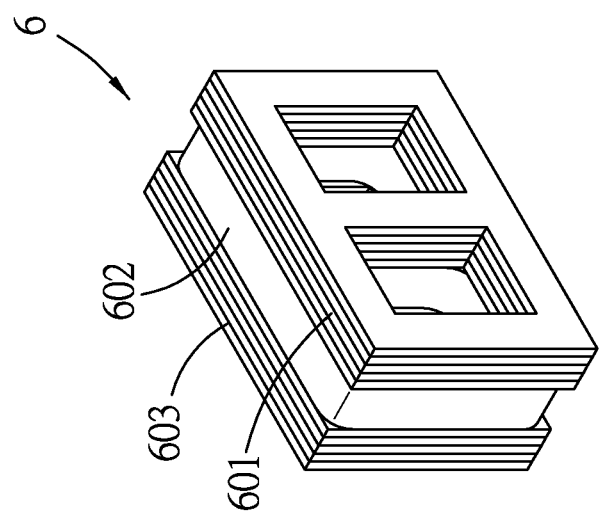
FIG. 8 is a perspective view of a second implementation of the magnetic core unit of each reluctance component of the embodiment.
Figure 7:
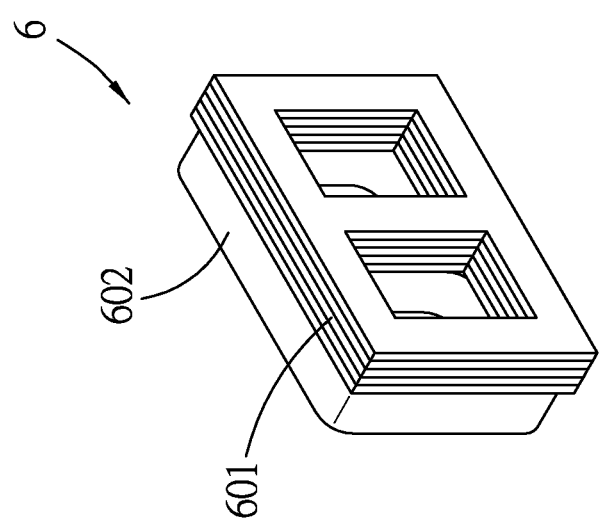
FIG. 7 is a perspective view of the first implementation of the magnetic core unit of each reluctance component of the embodiment.

Referring to FIGS. 2 to 4, each reluctance component (R, S, T) includes a magnetic core unit 6 which has a loop-shaped first segment 62 and a second segment 61 connected to the first segment 62, and which is made of a plurality of magnetic core materials such that the magnetic core unit 6 is both capacitive and inductive. In this embodiment, fox each reluctance component (R, S, T), the second segment 61 is surrounded by the first segment 62 and extends between oppositely disposed sections 63, 64 of the first segment 62. In addition, as shown in FIGS. 6 and 7, the magnetic core unit 6 of each reluctance component (R, S, T) may include a first set of capacitive silicon steel sheets 601 and an inductive amorphous magnetic core 602 that are arranged in a s tack with no air gap between the inductive amorphous magnetic core 602 and the first set of capacitive silicon steel sheets 601. Alternatively, as shown in FIG. 8, the magnetic core unit 6 of each reluctance component (R, S, T) may further include a second set of capacitive silicon steel sheets 603, and the inductive amorphous magnetic core 602 may be sandwiched between the first and second sets of capacitive silicon steel sheets 601, 603 with no air gap between the inductive amorphous magnetic core 602 and the first set of capacitive silicon steel sheets 601 and no air gap between the inductive amorphous magnetic core 602 and the second set of capacitive silicon steel sheets 603.

Referring to FIGS. 2-4 again, each reluctance component (R, S, T) further includes a first coil (L1) and a resonant circuit 7. It is noted that, since the reluctance components (R, S, T) have the same configuration, only one of the reluctance components (R, S, T) is exemplarily described hereinafter for the sake of brevity. In this embodiment, the resonant circuit 7 includes a second coil (L2) having a first terminal and a second terminal, a third coil (L3) having a first terminal and a second terminal, a first capacitor (C1), and a second capacitor (C2). The first, second and third coils (L1, L2, L3) are wound around, loosely coupled to and insulated from the first segment 62. The first capacitor (C1) is connected between the second terminal of the second coil (L2) and the first terminal of the third coil (L3). The second capacitor (C2) is connected to the third coil (L3) in parallel. As a result, the second coil (L2) and the first capacitor (C1) constitute a series resonant unit, and the third coil (L3) and the second capacitor (C2) constitute a parallel resonant unit. The first and second coils (L1, L2) are respectively wound around, loosely coupled to and insulated from sections 65, 67 of the first segment 62 that are disposed on opposite sides of the second segment 61, and the second and third cells (L2, L3) are wound around, loosely coupled to and insulated from the same section 67 of the first segment 62.

Since the first, second and third coils (L1, L2, L3) are loosely coupled to and insulated from the magnetic core unit 6, and since there is no air gap between the first set of capacitive silicon steel sheets 601 (see FIG. 7) and the inductive amorphous magnetic core 602 (see FIG. 7) or among the first and second sets of capacitive silicon steel sheets 601, 603 (see FIG. 3) and the inductive amorphous magnetic core 602 (see FIG. 8), the magnetic core unit 6 rapidly reaches magnetic saturation when the first coil (L1) is excited with a current to generate a magnetic field that magnetizes the magnetic core unit 6, and when provision of the current to the first coil (L1) is subsequently stopped, the magnetic core unit 6 is demagnetized in a very short time, resulting in positive magnetic damping effect (i.e., magnetic shunt), and generates an eddy current coupled to the second and third coils (L2, L3) as a result of release of magnetic energy, so that the electrical energy outputted by the second and third coils (L2, L3) is increased as a consequence.

Figure 9:
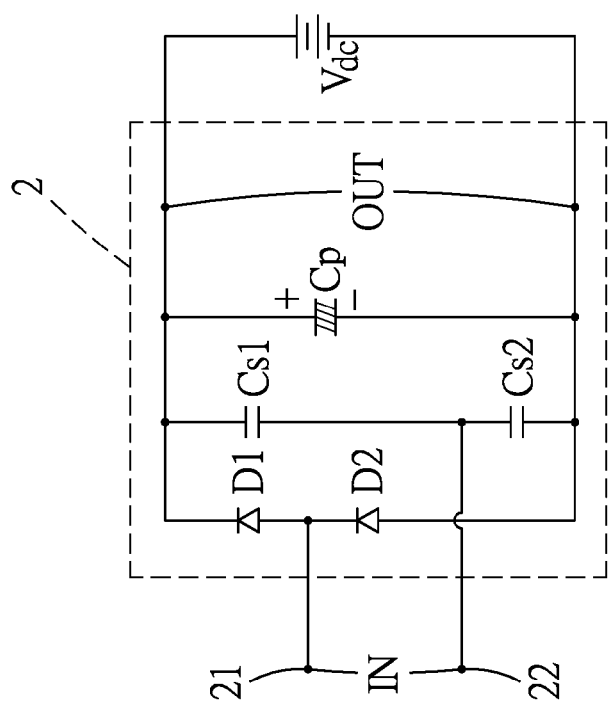
FIG. 9 is a schematic circuit diagram illustrating a first implementation of each damping module of the embodiment.

The damping module 2 has an input side (IN) that includes a first input terminal 21 and a second input terminal 22, and that is connected to the resonant circuit 7 for receiving electrical energy therefrom, and an output side (OUT) that is used to be connected to a DC (direct current) power source (Vdc) (e.g., a rechargeable battery) for releasing electrical energy thereto. In this embodiment, as shown in FIG. 9, the damping module 2 may include a first diode (D1), a second diode (D2), a first non-polarized capacitor (Cs1), a second non-polarized capacitor (Cs2) and a polarized capacitor (Cp). The first diode (D1) has an anode that serves as the first input terminal 21 and that is connected to the first terminal of the second coil (L2), and a cathode that serves as one terminal of the output side (OUT) and that is used to be connected to a positive terminal of the DC power source (Vdc). The second diode (D2) has an anode that serves as another terminal of the output side (OUT) and that is used to be connected to a negative terminal of the DC power source (Vdc), and a cathode that is connected to the anode of the first diode (D1). The first non-polarized capacitor (Cs1) has a first terminal that is connected to the cathode of the first, diode (D1), and a second terminal that serves as the second input terminal 22 and that is connected to the second terminal of the third coil (L3). The second non-polarized capacitor (Cs2) is connected between the second terminal of the first non-polarized capacitor (Cs1) and the anode of the second diode (D2). The polarized capacitor (Cp) (e.g., a supercapacitor or an electrolytic capacitor) has a positive lead connected to the cathode of the first diode (D1), and a negative lead connected to the anode of the second diode (D2). In addition, each of the first and second non-polarized capacitors (Cs1, Cs2) may be a high frequency capacitor. As a result, the first and second non-polarized capacitors (Cs1, Cs2) and the polarized capacitor (Cp) constitute a damping capacitor unit capable of storing a large amount of electrical energy. Characteristics and functions of the damping capacitor unit are disclosed in Taiwanese Patent No. M477033, and details thereof are omitted herein for the sake of brevity.

Figure 10:
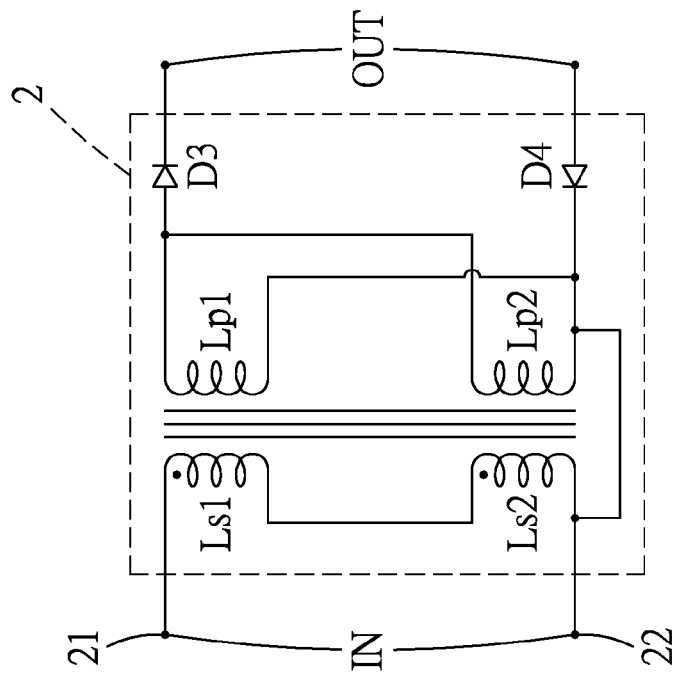
FIG. 10 is a schematic circuit diagram illustrating a second implementation of each damping module of the embodiment.

Alternatively, as shown in FIG. 10, the damping module 2 may include a first inductor (Ls1), a second inductor (Ls2), a third inductor (Lp1), a fourth inductor (Lp2), a third diode (D3) and a fourth diode (D4). The first inductor (Ls1) has a first terminal that serves as the first input terminal 21 and that is connected to the first terminal of the second coil (L2), and a second terminal. The second inductor (Ls2) has a first terminal that is connected to the second terminal of the first inductor (Ls1), and a second terminal that serves as the second input terminal 22 and that is connected to the second terminal of the third coil (L3). The third inductor (Lp1) has a first terminal, and a second terminal that is coupled to the second terminal of the second inductor (Ls2). The fourth inductor (Lp2) is connected to the third inductor (Lp1) in parallel. The third diode (D3) has an anode that is connected to the first terminal of the third inductor (Lp1), and a cathode that serves as one terminal of the output side (OUT) and that is used to be connected to the positive terminal of the DC power source (Vdc). The fourth diode (D4) has an anode that serves as another terminal of the output side (OUT) and that is used to be connected to the negative terminal of the DC power source (Vdc), and a cathode that is connected to the second terminal of the third inductor (Lp1). As a result, the first, second, third and fourth inductors (Ls1, Ls2, Lp1, Lp2) of the damping module 2 constitute a damping inductor unit capable of storing electrical energy. Characteristics and functions of the damping inductor unit are disclosed in Taiwanese Patent No. M470365, and details thereof are omitted herein for the sake of brevity.

Referring to FIGS. 2 to 5, the driving module 5 is connected to the first coil (L1) of each reluctance component (R, S, T), is used to be connected to the DC power source (Vdc), and is configured to connect the DC power source (Vdc) to the first coil (L1) of each reluctance component (R, S, T) in such a way that a respective AC (alternating current) voltage is generated across the first coil (L1) of each reluctance component (R, S, T). In this embodiment, the driving module 5 includes a number (N) (i.e., three in this embodiment) of switching circuits 51-53. Each switching circuit 51-53 includes a first switch (S1), a second switch (S2), a third switch (S3), a fourth switch (S4) and four freewheeling diodes (D). For each switching circuit 51-53, the first switch (S1) has a first terminal that is used to be connected to the positive terminal, of the DC power source (Vdc), and a second terminal that is connected to one terminal (R+, S+, T+) of the first coil (L1) of a respective reluctance component (R, S, T); the second switch (S2) has a first terminal that is connected to the second terminal of the first switch (S1), and a second terminal that is used to be connected to the negative terminal of the DC power source (Vdc); the third switch (S3) has a first terminal that is connected to the first terminal of the first switch (S1), and a second terminal that is connected to another terminal (R−, S−, T−) of the first coil (L1) of the respective reluctance component (R, S, T); the fourth switch (S4) has a first terminal that is connected to the second terminal of the third switch (S3), and a second terminal that is connected to the second terminal of the second switch (S2); and the freewheeling diodes (D) are connected respectively to the first, second, third and fourth switches (S1, S2, S3, 34) in parallel with each freewheeling diode (D) having an anode coupled to the second terminal of the respective switch (S1-S4).

Figure 11:
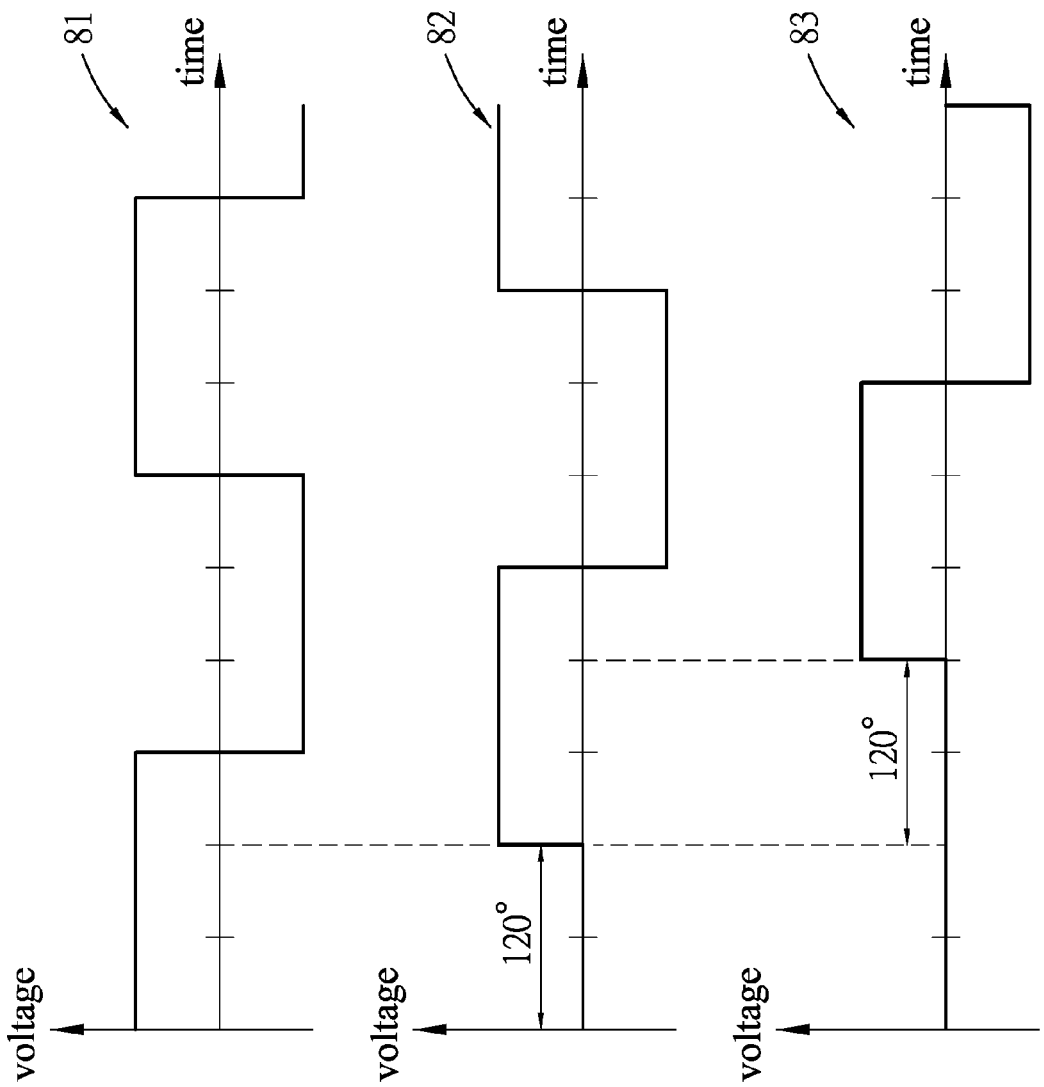
FIG. 11 is a timing diagram illustrating AC voltages respectively across first coils of the reluctance components of the embodiment.
Figure 12:
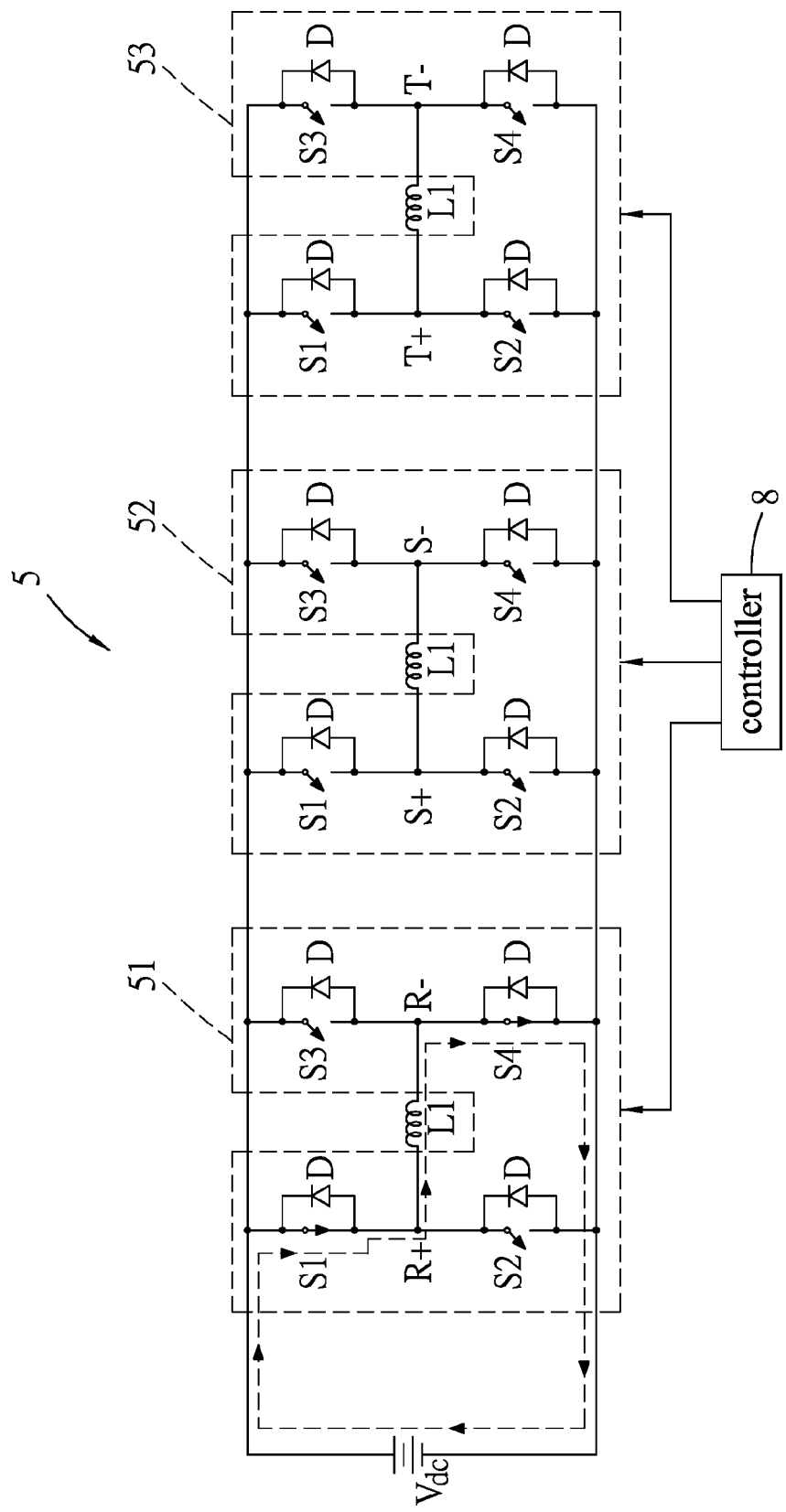
FIG. 12 is a schematic circuit block diagram illustrating operation of a driving circuit of the embodiment.
Figure 13:
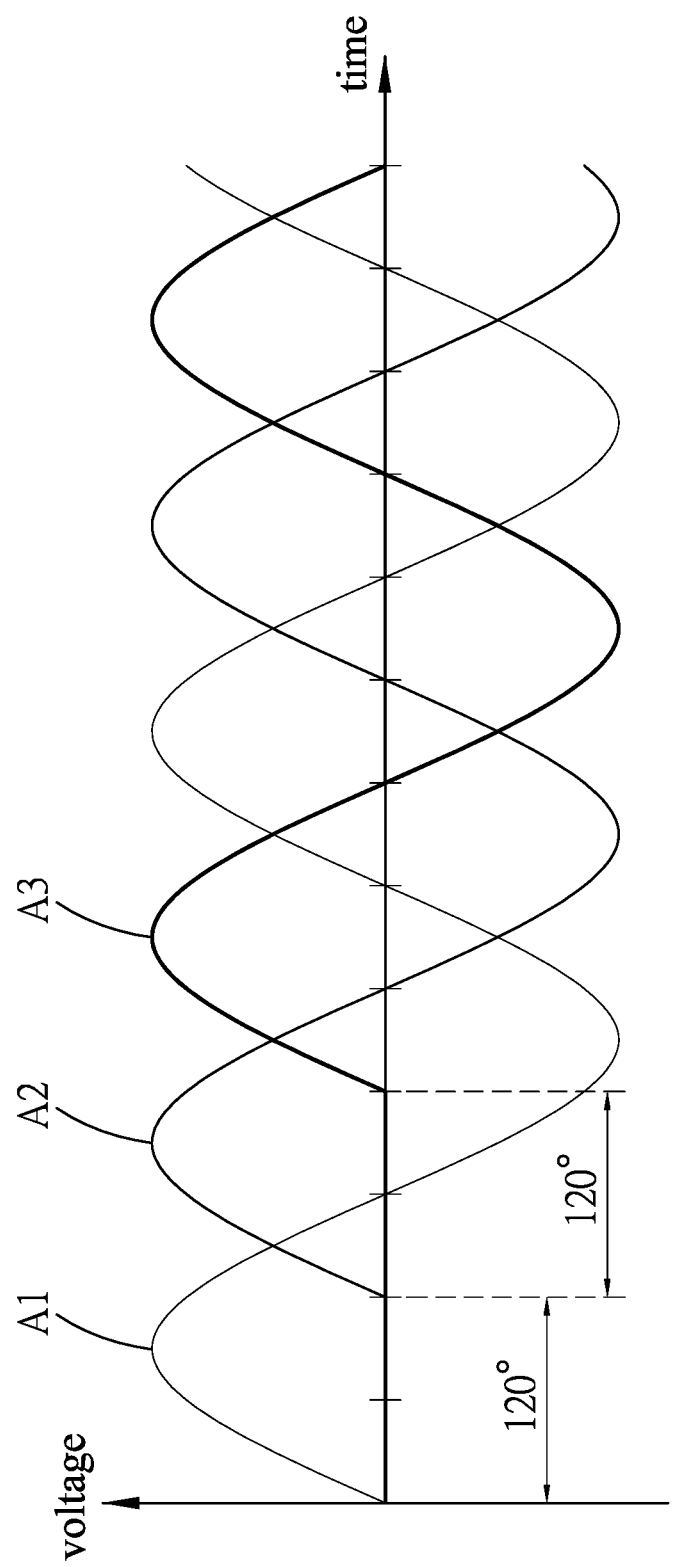
FIG. 13 is a timing diagram illustrating AC voltages generated respectively by the reluctance components of the embodiment.
Figure 14:
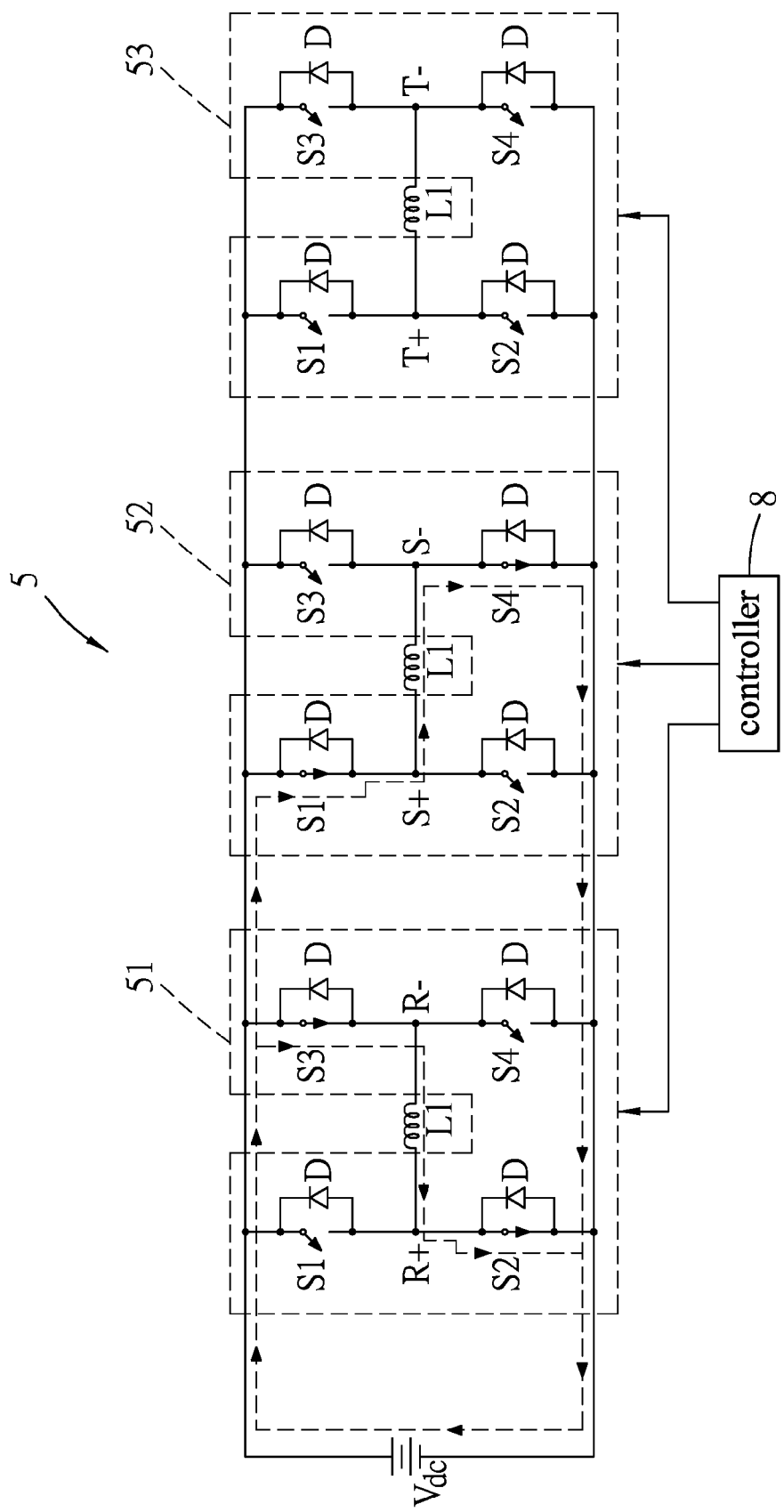
FIG. 14 is a schematic circuit block diagram illustrating operation of the driving circuit of the embodiment.

The controller 3 is connected to the switching circuits 51-53, and controls, using pulse width modulation, operation of each of the first, second, third and fourth switches (S1-S4) of the switching circuits 51-53 between an ON state and an OFF state. In this embodiment, under the control of the controller 8, a phase of the AC voltage across the first coil (L1) of an $(n+1)^{th}$ one of the reluctance components (S, T) lags a phase of the AC voltage across the first coil (L1) of an $n^{th}$ one of the reluctance components (R, S) by (360°/N) (i.e., 120° in this embodiment), where $1 \leq n \leq (N-1)$ (i.e., $1 \leq n \leq 2$ in this embodiment). For example, as shown in FIG. 11, a phase of the AC voltage 82 across the first coil (L1) of the second reluctance component (3) lags a phase of the AC voltage 81 across the first coil (L1) of the first reluctance component (R) by 120°, and a phase of the AC voltage 83 across the first coil (L1) of the third reluctance component (T) lags the phase of the AC voltage 82 across the first coil (L1) of the second reluctance component (S) by 120°.

Referring to FIGS. 2 to 4 and 11 to 13, in the beginning, when the first and fourth switches (S1, S4) of the switching circuit 51 are in the ON state while the second and third switches (S2, S3) of the switching circuit 51 and the first to fourth switches (S1-S4) of the switching circuits 52, 53 are in the OFF state, the AC voltage 31 across the first coil (L1) of the first reluctance component (R) has a positive magnitude, magnitude of the AC voltage 82, 83 across the first coil (L1) of each of the second and third reluctance components (S, T) is zero, and a current provided by the DC power source (Vdc) flows through and excites the first coil (L1) of the first reluctance component (R). As a result, a magnetic field is generated to magnetize the magnetic core unit 6 of the first reluctance component (R), such that the magnetic core unit 6 of the first reluctance component (R) reaches magnetic saturation rapidly and becomes a magnet instantly. Then, the first and fourth switches (S1, S4) of the switching circuit 51 simultaneously enter the OFF state, the magnetic core unit 6 of the first reluctance component (R) is demagnetized in a very short time due to magnetic shunt, and generates an eddy current coupled to the second and third coils (L2, L3) of the first reluctance component (R). During a time period where the AC voltage 81 across the first coil (L1) of the first reluctance component (R) has the positive magnitude, the AC voltage 81 across the first coil (L1) of the first reluctance component (R) causes the resonant circuit 7 of the first reluctance component (R) to generate a respective sinusoidal AC voltage (A1) with a positive magnitude due to resonance; and the resonant circuit 7 of the first reluctance component (R) resonates with the respective damping module 2, such that the electrical energy of the sinusoidal AC voltage (A1) is transmitted to the respective damping module 2. In the implementation as shown in FIG. 9, the sinusoidal AC voltage (A1) with the positive magnitude is rectified by the first diode (D1) of the respective damping module 2, and a voltage thus generated charges the first non-polarized capacitor (Cs1) of the respective damping module 2. In the implementation as shown in FIG. 10, the sinusoidal AC voltage (A1) with the positive magnitude is coupled from the first and second inductors (Ls1, Ls2) of the respective damping module 2 to the third and fourth inductors (Lp1, Lp2) of the respective damping module 2, and is rectified by the third diode (D3) of the respective damping module 2, and a voltage thus generated charges the DC power source (Vdc).

Referring to FIGS. 2 to 4, 11 and 14, when the second and third switches (S2, 33) of the switching circuit 51 and the first and fourth switches (S1, 34) of the switching circuit 52 are in the ON state while the first and fourth switches (S1, S4) of the switching circuit 51, the second and third switches (32, 33) of the switching circuit 52 and the first to fourth switches (S1-S4) of the switching circuit 53 are in the OFF state, the AC voltage S1 across the first coil (L1) of the first reluctance component (R) has a negative magnitude, the AC voltage 32 across the first coil (L1) of the second reluctance component (S) has a positive magnitude, the magnitude of the AC voltage S3 across the first coil (L1) of the third reluctance component (T) is zero, and the current provided by the DC power source (Vdc) flows through and excites the first coils (L1) of the first and second reluctance components (R, S). As a result, a magnetic field is generated to magnetize the magnetic core unit 6 of the first reluctance component (R), such that the magnetic core unit 6 of the first reluctance component (R) reaches magnetic saturation rapidly and becomes a magnet instantly. Then, the second and third switches (S2, S3) of the switching circuit 51 simultaneously enter the OFF state, the magnetic core unit 6 of the first reluctance component (R) is demagnetized in a very short time due to magnetic shunt, and generates an eddy current coupled to the second and third coils (L2, L3) of the first reluctance component (R). During a time period where the AC voltage 81 across the first coil (L1) of the first reluctance component (R) has the negative magnitude, the AC voltage 81 across the first coil (L1) of the first reluctance component (R) causes the resonant circuit 7 of the first reluctance component (R) to generate the respective sinusoidal AC voltage (A1) with a negative magnitude due to resonance; and the resonant circuit 7 of the first reluctance component (R) resonates with the respective damping module 2, such that the electrical energy of the sinusoidal AC voltage (A1) is transmitted to the respective damping module 2. In the implementation as shown in FIG. 9, the sinusoidal AC voltage (A1) with the negative magnitude is rectified by the second diode (D2) of the respective damping module 2, and a voltage thus generated charges the second non-polarized capacitor (Cs2) of the respective damping module 2; and since a voltage across the first and second non-polarized capacitors (Cs1, Cs2) of the respective damping circuit 2 equals a voltage across the polarized capacitor (Cp) of the respective damping circuit 2, and since the non-polarized characteristic of the first and second non-polarized capacitors (Cs1, Cs2) of the respective damping circuit 2, the polarized capacitor (Cp) of the respective damping circuit 2 can release electrical energy to charge the DC power source (Vdc) when a voltage provided by the DC power source (Vdc) is lower than the voltage across the polarized capacitor (Cp) of the respective damping circuit 2. In the implementation as shown in FIG. 10, the sinusoidal AC voltage (A1) with the negative magnitude is coupled from the first and second inductors (Ls1, Ls2) of the respective damping module 2 to the third and fourth inductors (Lp1, Lp2) of the respective damping module 2, and is rectified by the fourth diode (D4) of the respective damping module 2, and a voltage thus generated charges the DC power source (Vdc). Therefore, the sinusoidal AC voltage (A1) has a frequency equal to that of the AC voltage 81 across the first coil (L1) of the first reluctance component (R).

In addition, operations of the switching circuit 52, the second reluctance component (S) and the respective damping module 2 are similar to the operations of the switching circuit 51, the reluctance component (R) and the respective damping module 2 as described above. Therefore, the sinusoidal AC voltage (A2) generated by the resonate circuit 7 of the second reluctance component (S) has a frequency equal to that of the AC voltage 82 across the first coil (L1) of the second reluctance component (S), and a phase thereof lags a phase of the sinusoidal AC voltage (A1) by 120°.

Moreover, operations of the switching circuit 53, the third reluctance component (T) and the respective damping module 2 are similar to the operations of the switching circuit 51, the reluctance component (R) and the respective damping module 2 as described above. Therefore, the sinusoidal AC voltage (A3) generated by the resonate circuit 7 of the third reluctance component (T) has a frequency equal to that of the AC voltage 83 across the first coil (L1) of the third reluctance component (T), and a phase thereof lags the phase of the sinusoidal AC voltage (A2) by 120°.

In view of the above, under the control of the controller 8, the first coil (L1) of each reluctance component (R, S, T) is excited by the current provided by the DC power source (Vdc) repeatedly, such that the magnetic core unit 6 of each reluctance component (R, S, T) is rapidly magnetized and rapidly demagnetized alternately to keep generation of the eddy current coupled to the second and third coils (L2, L3) of the reluctance component (R, S, T); the AC voltage 81-83 generated across the first coil (L1) of each reluctance component (R, S, T) causes the respective resonant circuit 7 to continuously generate the respective AC sinusoidal voltage (A1-A3) due to resonance; and each damping module 2 receives the electrical energy of the respective AC sinusoidal voltage (A1-A3), and releases the electrical energy to charge the DC power source (Vdc). As a result, the magnetoelectric device according to this disclosure is capable of damping power amplification since magnetic energy of each magnetic core unit 6 that has positive magnetic damping effect is converted into electrical energy for output, such that output electrical energy is increased, thus promoting usable electrical energy stored in the DC power source (Vdc).

It is noted that, in other embodiments, N may be a plural number other than three.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that the disclosure is not limited to the disclosed embodiment(s) but is intended to cover various arrangements included within the spirit and scope of the broadest interpretation so as to encompass all such modifications and equivalent arrangements.

What is claimed is:

1. A magnetoelectric device comprising:
   a plurality of reluctance components, each of which includes a magnetic core unit, a first coil and a resonant circuit, wherein for each of said reluctance components,
   said magnetic core unit is both capacitive and inductive, and has a loop-shaped first segment, and a second segment connected to said first segment,
   said resonant circuit includes a second coil having a first terminal and a second terminal, a third coil having a first terminal and a second terminal, a first capacitor connected between said second terminal of said second coil and said first terminal of said third coil, and a second capacitor connected to said third coil in parallel, and
   said first, second and third coils are wound around and loosely coupled to said first segment;
   a plurality of damping modules, each of which is connected to said resonant circuit of a respective one of said reluctance components for receiving electrical energy therefrom, and each of which is used to be connected to a DC (direct current) power source for releasing electrical energy thereto; and
   a driving module which is connected to said first coil of each of said reluctance components, which is used to be connected to the DC power source, and which is configured to connect the DC power source to said first coil of each of said reluctance components in such a way that a respective AC (alternating current) voltage is generated across said first coil of each of said reluctance components.

2. The magnetoelectric device of claim 1, wherein for each of said reluctance components, said second segment is surrounded by said first segment and extends between oppositely disposed sections of said first segment, said first and second coils are respectively wound around and loosely coupled to sections of said first segment that are disposed on opposite sides of said second segment, and said second and third coils are wound around and loosely coupled to a same section of said first segment.

3. The magnetoelectric device of claim 1, wherein for each of said reluctance components, said magnetic core unit includes a first set of capacitive silicon steel sheets and an inductive amorphous magnetic core that are arranged in a stack.

4. The magnetoelectric device of claim 3, wherein for each of said reluctance components, said magnetic core unit further includes a second set of capacitive silicon steel sheets, and said inductive amorphous magnetic core is sandwiched between said first and second sets of capacitive silicon steel sheets.

5. The magnetoelectric device of claim 1, wherein said driving module includes a plurality of switching circuits, each of which includes:
   a first switch having a first terminal that is used to be connected to a positive terminal of the DC power source, and a second terminal that is connected to one terminal of said first coil of a respective one of said reluctance components;
   a second switch having a first terminal that is connected to said second terminal of said first switch, and a second terminal that is used to be connected to a negative terminal of the DC power source;
   a third switch having a first terminal that is connected to said first terminal of said first switch, and a second terminal that is connected to another terminal of said first coil of the respective one of said reluctance components; and a fourth switch having a first terminal that is connected to said second terminal of said third switch, and a second terminal that is connected to said second terminal of said second switch.

6. The magnetoelectric device of claim 5, wherein each of said switching circuits further includes four freewheeling diodes which are connected respectively to said first, second, third and fourth switches in parallel, and each of which has an anode coupled to said second terminal of the respective one of said first, second, third and fourth switches.

7. The magnetoelectric device of claim 5, further comprising a controller that is connected to said switching circuits, and that controls operation of each of said first, second, third and fourth switches of said switching circuits between an ON state and an OFF state.

8. The magnetoelectric device of claim 1, wherein a phase of the AC voltage across said first coil of an $(n+1)^{th}$ one of said reluctance components lags a phase of the AC voltage across said first coil of an $n^{th}$ one of said reluctance components by $(360°/N)$, where N is a number of said reluctance components, and where $1 \leq n \leq (N-1)$.

9. The magnetoelectric device of claim 1, wherein each of said damping modules includes:
a first diode having an anode that is connected to said first terminal of said second coil of the respective one of said reluctance components, and a cathode that is used to be connected to a positive terminal of the DC power source;
a second diode having an anode that is used to be connected to a negative terminal of the DC power source, and a cathode that is connected to said anode of said first diode;
a first non-polarized capacitor having a first terminal that is connected to said cathode of said first diode, and a second terminal that is connected to said second terminal of said third coil of the respective one of said reluctance components;
a second non-polarized capacitor connected between said second terminal of said first non-polarized capacitor and said anode of said second diode; and
a polarized capacitor connected between said cathode of said first diode and said anode of said second diode.

10. The magnetoelectric device of claim 9, wherein for each of said damping modules, each of said first and second non-polarized capacitors is a high frequency capacitor.

11. The magnetoelectric device of claim 1, wherein each of said damping modules includes:
a first inductor having a first terminal that is connected to said first terminal of said second coil of the respective one of said reluctance components, and a second terminal;
a second inductor having a first terminal that is connected to said second terminal of said first inductor, and a second terminal that is connected to said second terminal of said third coil of the respective one of said reluctance components;
a third inductor having a first terminal, and a second terminal that is coupled to said second terminal of said second inductor;
a fourth inductor connected to said third inductor in parallel;
a first diode having an anode that is connected to said first terminal of said third inductor, and a cathode that is used to be connected to a positive terminal of the DC power source; and
a second diode having an anode that is used to be connected to a negative terminal of the DC power source, and a cathode that is connected to said second terminal of said third inductor.

* * * * *